United States Patent [19]

Showalter

[11] 4,358,157
[45] * Nov. 9, 1982

[54] SOLUTION MINING PROCESS

[75] Inventor: William E. Showalter, Seal Beach, Calif.

[73] Assignee: Union Oil Company of California, Brea, Calif.

[*] Notice: The portion of the term of this patent subsequent to Aug. 8, 1995, has been disclaimed.

[21] Appl. No.: 894,936

[22] Filed: Apr. 10, 1978

Related U.S. Application Data

[63] Continuation-in-part of Ser. No. 767,788, Feb. 11, 1977, Pat. No. 4,105,253.

[51] Int. Cl.$^3$ ............................................. E21B 43/28
[52] U.S. Cl. ..................................................... 299/4
[58] Field of Search ................. 299/4, 5; 166/3 R, 15, 166/17; 423/18, 20

[56] References Cited

U.S. PATENT DOCUMENTS

| | | | |
|---|---|---|---|
| 3,130,960 | 4/1964 | Martin | 299/4 |
| 3,278,233 | 10/1964 | Hurd et al. | 299/4 |
| 3,708,206 | 1/1973 | Hard et al. | 299/5 |
| 3,713,698 | 1/1973 | Rhoades | 299/4 |
| 3,792,903 | 2/1974 | Rhodes | 299/5 |
| 4,032,194 | 6/1977 | Howell et al. | 299/4 |
| 4,066,297 | 1/1978 | Spence | 299/4 |
| 4,105,253 | 8/1978 | Showalter | 299/4 |

OTHER PUBLICATIONS

"Winning of Useful Elements from Minerals by Leaching Underground", Mining Magazine, vol. 118, No. 2, Feb., 1968, pp. 129, 131, 133 & 134.

Primary Examiner—William F. Pate, III
Attorney, Agent, or Firm—Dean Sandford; Daniel R. Farrell

[57] ABSTRACT

Process for the solution mining of minerals from a subterranean formation using a dilute aqueous carbonic acid leaching solution and intermittent injection of an oxidizing agent.

17 Claims, 1 Drawing Figure

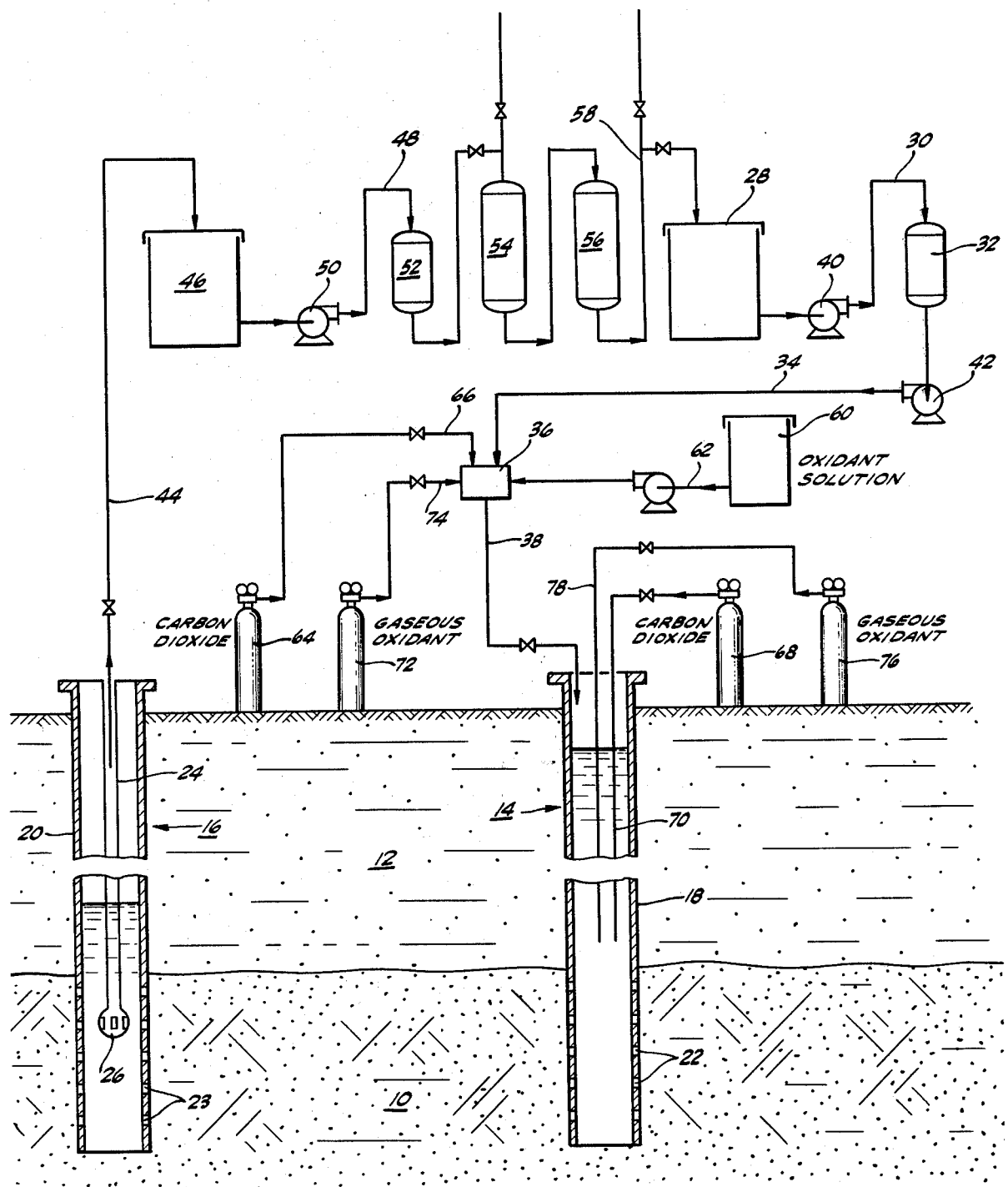

SOLUTION MINING PROCESS

RELATED APPLICATION

This is a continuation-in-part of application Ser. No. 767,788, filed Feb. 11, 1977 and now U.S. Pat. No. 4,105,253.

BACKGROUND OF THE INVENTION

1. Field of the Invention

This invention relates to the recovery of mineral values from subterranean formations and more particularly to a process for leaching subterranean mineral deposits to recover the mineral values.

2. Description of the Prior Art

The in situ leaching of mineral values from subterranean deposits is well-known in the art as a practical and economical means for recovering certain elements such as uranium, copper, nickel, molybdenum, rhenium, vanadium and the like. Basically, solution mining is carried out by injecting into the subterranean deposit a leaching solution which will solubilize the mineral values desired to be recovered, and the solution and solubilized mineral values, i.e., the pregnant liquor, are then recovered from the deposit for subsequent separation of the mineral values.

The cost of the chemicals employed in solution mining processes is a major factor in determining the economic viability of the process. Besides the leaching solution itself, oxidants, such as hydrogen peroxide or oxygen-containing gases, are often injected to enhance the leaching of those minerals which are only soluble, or are more readily soluble, in their oxidized forms. The solution mining processes of the prior art typically involve the injection of the oxidant continuously throughout the process. On the other hand, U.S. Pat. Nos. 3,278,233 and 3,708,206 disclose the injection of an oxygen-bearing gas to displace ground water from the formation prior to injection of the leaching solution. The large quantity of oxidant required in some of these processes can be economically prohibitive.

Depending upon the nature of the subterranean deposit, the typical leaching olution may be an acid, for example, an aqueous sulfuric acid solution or may comprise an alkaline carbonate solution. In view of the high proportion of carbonates typically present in many subterranean formations, the use of the known acid solutions is usually economically prohibitive because of the excessive consumption of acid due to carbonate solubilization. Consequently, alkaline carbonate leaching solutions are preferred over acid solutions for solution mining operations when carbonates are present in the formation.

Various solution mining processes involving the use of alkaline carbonate leaching solutions are disclosed in the prior art, for example in U.S. Pat. No. 3,708,206, using an aqueous ammonium carbonate solution and an oxidizing agent and U.S. Pat. No. 2,896,930, utilizing an aqueous solution of an alkali metal carbonate and hydrogen peroxide. Typically, the alkaline carbonate leaching solutions are maintained at a pH of about 8.2 to about 8.3. However, alkaline carbonate leaching solutions can present problems with respect to reduction of injectivity of the leaching solution and consequently reduced mineral production. Reduced injectivity can generally be ascribed to two major factors. The first factor is the swelling of formation clays by the alkaline solution. A second major factor is the exchange of cations, such as sodium, from the leaching solution with the calcium ions of the formation which results in the production of calcium carbonate in the leaching solution. Calcium carbonate, at the alkaline pH's utilized, precipitates from the leaching solution thus reducing the permeability of the formation, well injectivity, and causes scaling problems in the pumps and other ancillary equipment utilized in the process.

Another problem which arises from the use of the prior art alkaline carbonate leaching solutions, particularly the ammonium carbonate and/or ammonium bicarbonate leaching solutions, involves the restoration of the ground water in the subterranean formation to its preleach condition once the solution mining process has been completed. The cations introduced into the formation by these leaching solutions are ionically exchanged into the formation matrix and must later be removed. The removal of these exchanged cations is often difficult and, in the case of the ammonium ion, has been found to require a prohibitively long restoration period.

The present invention overcomes the foregoing deficiencies by providing a process for the recovery of mineral values from subterranean formations in which the loss of permeability and production associated with the alkaline carbonate leaching solutions is avoided. Also, the method of this invention requires significantly less oxidant than the prior art processes and therefore is more economically feasible.

SUMMARY OF THE INVENTION

The present invention relates to the extraction and recovery of substances from subterranean deposits by contacting the subterranean deposit with a non-alkaline carbonated leaching solution for the in situ solubilization of the substance to be recovered, extracting the pregnant liquor from the formation and separating the substance to be recovered from the pregnant liquor. More particularly the leaching solution comprises a dilute aqueous carbonic acid solution. An oxidizing agent for the substance to be recovered is injected intermittently to oxidize the substance to be recovered to a more soluble form. Preferably the leaching solution is formed by dissolving gaseous carbon dioxide in the native ground water.

In one preferred embodiment of the method of this invention, the oxidant is dissolved in a portion of the leaching solution to form an oxidant-containing leaching solution, and a slug of leaching solution which is relatively oxidant-free is introduced into the formation between slugs of the oxidant-containing leaching solution.

The present invention avoids many of the problems associated with solution mining processes using alkaline carbonate leaching solutions, particularly the reduction of formation permeability and well injectivity. Additionally, the oxidant costs are significantly reduced. Other advantages and features of the present invention will become apparent from the following detailed description and from the drawing appended hereto.

BRIEF DESCRIPTION OF THE DRAWING

The drawing is a schematic diagram of a solution mining operation in which the present invention is practiced.

DETAILED DESCRIPTION OF THE INVENTION

In the following description and examples the invention will be described in connection with the recovery of uranium values by the solubilization thereof from uranium bearing ores. However, it should be clear that the invention is applicable to the solution mining of other mineral values capable of forming soluble reaction products with the dilute carbonic acid leaching solution. Thus, for example, substances such as vanadium, molybdenum, nickel, copper, the rare earths and the like can be recovered using the process of the present invention.

Uranium minerals frequently occur in the highly siliceous rocks and sedimentary deposits, generally as a mixture of the insoluble quadrivalent form and the soluble sexivalent form. Uranium is also found in association with the silicates, phosphates and zirconates of the rare earths and with columbium, tantalum and thorium. Pitchblende, an amorphous compound of uranium, frequently occurs with sulfite minerals and other uranium minerals, containing, for example, 40 to 90% $U_3O_8$ (i.e. $UO_2.2UO_3$). In addition uranium is often associated with other metals such as calcium, thorium, iron, bismuth, copper and zinc in various mineral forms. Thus, for example, common uranium minerals include carnotite, $K_2(UO_2)_2(VO_4)_2.3H_2O$; coffinite, $U(SiO_4)_{1-x}(OH)_{4x}$; Schroeckingerite, $NaCa_3(UO_2)(CO_3)_3.(SO_4)F.10H_2O$; and uraninite, $(U^{+4}_{1-x}, U_x^{+6})O_{2+x}$, ideally $UO_2$.

In solution mining processes, an oxidizing agent is utilized to contact the mineral deposit to oxidize the uranium to its soluble sexivalent form. A leaching solution then solubilizes the sexivalent uranium, which is extracted with the solution. The oxidation of the uranium can be carried out as a separate step or simultaneously with the leaching step by dissolving the oxidizing agent in the leaching solution. As mentioned above, conventional alkaline carbonate solutions, for example ammonium carbonate or sodium carbonate and/or bicarbonate solutions, lead to swelling of the formation clay, and ion exchange with calcium ions, both of which situations can lead to plugging, scaling, injectivity and production loss.

Conventionally, the leaching solution is brought into contact with the subterranean deposit by injection into one or more injection wells which penetrate the deposit. The leaching solution is introduced into the injection well under sufficient pressure to force it out of the well bore into the adjacent deposit. Continued injection of leaching solution drives the solution through the deposit to one or more spaced-apart production wells where the pregnant liquor thus formed is recovered for subsequent extraction of the mineral values. The number of injection and production wells and the spacing therebetween can vary depending upon the nature of the formation. Additionally, the pattern of injection and production wells can also vary, although a typical pattern is the five-spot pattern consisting of a centrally disposed recovery well and four injection wells spaced around the recovery well. Alternatively, a given volume of leaching solution can be injected into a well to percolate into the surrounding formation. Following the injection phase, the well is pumped out and the injected leaching solution is recovered from the same well into which it had been injected.

Referring to the drawing, a mineral-bearing formation 10 underlies an overburden 12 and, for the purposes of illustration, the mineral formation is taken to be uranium oxide as uraninite in association with a mixture of inorganic materials such as limestone, sand or mixtures of these. One or more injection wells 14 and one or more production wells 16 extend through the overburden 12 and penetrate the mineral deposit 10. The injection well 14 and the production well 16 have casings 18 and 20, respectively, which are sealed from the surrounding overburden 12. The lower portions of casings 18 and 20 extending through mineral deposit 10 are provided with perforations 22 and 23, respectively. A string of tubing 24 extends through the bore of the recovery well 16 and is provided with a downhole pump 26 for pumping fluids out of the recovery well. If desired, similar tubing can be provided in well 14 and with suitable valving and lines the process can be reversed so that well 16 becomes the injection well and well 14 becomes the production well.

Leaching solution is held in a tank 28 which is in communication with the injection well 14 through a conduit 30, a sand filter 32, a conduit 34, a mixing tank 36 and a conduit 38. Filtering pressure is provided by a pump 40 in the line 30, and a pump 42 in the line 34 provides the injection pressure for the leaching solution.

A conduit 44 communicates with the tubing 24 and leads to a holding tank 46 for receiving the pregnant liquor pumped from the well 16. A conduit 48, provided with a pump 50, communicates between the pregnant liquor holding tank 46 and a sand filter 52 which is provided for filtering the pregnant liquor prior to its passage through ion exchangers 54 and 56, each of which contain a strong base ion exchange resin bed for removal of the uranium values from the pregnant liquor to form a barren liquor. A conduit 58 conducts the liquid from exchanger 56 into barren liquor holding tank 28.

In one embodiment of the method of this invention, barren liquor from the tank 28 is filtered in the filter 32 and oxidizing agent from a tank 60 is intermittently introduced through a conduit 62 into the mixing tank 36 for admixture with the leaching solution prior to its introduction into the injection well 14.

The leaching solution may be introduced into the injection well 14 by pumping, such as by pump 42, or by gravity, and the leaching solution enters the mineral deposit 10 from well 14 through the perforations 22. While in contact with the mineral deposit 10, the oxidant oxidizes tetravalent uranium values and the leaching solution solubilizes the sexivalent uranium values to form a pregnant liquor. After percolation through formation 10, the pregnant liquor enters well 16 through perforations 23. Pump 26 serves to pump the pregnant liquor through the tubing 24 and the conduit 44 to the pregnant liquor holding tank 46. From the tank 46 the liquor is passed through the filter 52 and thence through the strong base anion exchange resin beds in ion exchangers 54 and 56 where the uranium values are separated from the solution and retained on the ion exchange resin. The solution, now barren of its uranium values, passes into barren liquor holding tank 28 for recirculation into the formation as described above. The uranium values are subsequently eluted from the ion exchange resin beds by conventional means, for example elution with sodium chloride or the like. Also, piping and valving, not shown, preferably are provided for periodic backwashing and cleaning of the ion exchange resin beds in the ion exchangers 54 and 56.

The leaching solution employed in the method of this invention is a dilute aqueous carbonic acid solution. The phrase "dilute carbonic acid solution" as used herein means a non-alkaline solution containing carbon dioxide in solution, normally in the form of carbonic acid and/or dissociated carbonic acid, i.e., hydronium cations and bicarbonate anions. The solution will of course contain a certain amount of bicarbonate salts, such as sodium bicarbonate and potassium bicarbonate, and various other anions and cations which are either present in the water used to make the solution or which are inherently leached from the subterranean formation during the recirculation of the leaching solution.

The concentration of carbonic acid must be at least sufficient to maintain the pH of the leaching solution at about 7 or below. At pH values substantially above 7, such as a pH of 8 or higher, the carbonic acid and bicarbonate anions are converted to carbonate anions which, as discussed above, tend to cause plugging and scaling problems. Generally the pH of the dilute carbonic acid solution will be less than about 7, and good results are obtained when the pH is between about 6 and about 7.

The dilute carbonic acid leaching solutions employed in the method of this invention generally are not saturated in carbon dioxide. At 50° F. and one atmosphere pressure, the solubility of carbon dioxide in water is about 2,340 ppm of carbon dioxide, which expressed as bicarbonate anion is about 3,200 ppm. For the sake of uniformity, the concentration of carbon dioxide, carbonic acid and bicarbonate is herein expressed collectively in terms of the bicarbonate anion, this being a simple and convenient measure of these concentrations. Accordingly, the dilute carbonic acid leaching solution will generally contain less than about 2500 ppm of bicarbonate anion. Preferably, the leaching solutions employed in the method of this invention have a concentration of from about 380 ppm to about 1000 ppm of bicarbonate anion, and good results are obtained when the solution contains between about 460 ppm and about 700 ppm of bicarbonate anion. The carbonic acid concentration of the leaching solution is preferably high enough within the above stated limits to provide a bicarbonate anion concentration in the pregnant liquor between about 600 and about 750 ppm.

Preferably, the fresh leaching solution is formed by dissolving carbon dioxide in water. Also, the water used is preferably ground water native to the subterranean formation to be leached. It is also contemplated that the leaching solution could be made by dissolving the water-soluble bicarbonate salts, such as sodium or potassium bicarbonate, in water and acidifying the solution thus formed to the desired pH, preferably by dissolution of carbon dioxide into the solution. In whatever manner the solution is formed, of course, upon circulation through the subterranean deposit, the solution will accumulate various cations which are ionically exchanged from the formation by the leaching solution. By the preferred method, i.e., dissolving carbon dioxide in the native ground water, no extraneous cations are introduced into the subterranean formation, thereby simplifying the subsequent restoration of the formation to its pre-leach condition.

Referring to the drawing, one preferred method for preparing the leaching solution is shown where carbon dioxide gas is led from pressurized container 64 through conduit 66 to mixing tank 36. In mixing tank 36 the carbon dioxide gas is dissolved in the barren liquor thus forming the leaching solution for injection into well 14. In addition, or alternatively, carbon dioxide can be introduced directly into well 14 from pressurized container 68 through conduit 70 to therein mix with the aqueous solution separately introduced into well 14 from tank 36 through conduit 38. Thus the dilute aqueous carbonic acid leaching solution can be formed on the earth surface prior to introduction into the injection well or can be formed in situ in the injection wells. Downhole introduction of carbon dioxide through conduit 70 takes advantage of the increased solubility of the carbon dioxide due to the hydrostatic head of leaching solution in well 14.

As mentioned, the quadrivalent uranium must be oxidized to its soluble sexivalent form for leaching. In this connection an oxidizing agent can be introduced either (a) simultaneously with the leaching solution or (b) alternately with slugs of the leaching solution either in a separate solution or as a gas. Preferably, however, the oxidant is solubilized in the leaching solution prior to introduction into the subterranean formation. Any of the conventionally used oxidizing agents can be employed as the oxidant in the present invention. For example, potassium permanganate, potassium ferricyanide, sodium hypochlorite, potassium peroxydisulfate, and hydrogen peroxide can be employed. In addition oxygen or oxygen-containing gases can provide the necessary oxidizing agent. Hydrogen peroxide and oxygen are preferred oxidizing agents, with commercially pure oxygen being particularly preferred.

The oxidant can be introduced into the leaching solution at various points in the circulation system depending upon the particular oxidant employed and the concentration of oxidant desired. As described above, an oxidant, such as hydrogen peroxide, can be introduced into the leaching solution in mixing tank 36 from tank 60 which contains a concentrated aqueous solution of the oxidant. Alternatively, if the oxidant is a gas, such as oxygen, it can be introduced into mixing tank 36 from pressurized container 72 through conduit 74. Where higher concentrations of a gaseous oxidant are desired, the oxidant is preferably introduced directly into injection well 14, such as from a pressurized container 76 through a conduit 78. The hydrostatic head of leaching solution above the injection point aids in dissolving higher concentrations of the oxidant.

It has been discovered that the amount of oxidant required to successfully extract uranium from subterranean formations can be reduced by using intermittent injection of the oxidant. Although not fully understood, it is believed that the oxidant enters into some type of reversible reaction with, or is reversibly absorbed onto, the formation constituents which results in an apparent consumption of the oxidant. Later, however, the oxidant is released back into a subsequently injected leaching solution which has a relatively low oxidant concentration. By intermittently injecting the oxidant, the oxidant which is adsorbed onto the formation can be later desorbed into the leaching solution for further oxidation of the desired mineral values. In this manner more efficient use of the oxidant can be achieved, thereby reducing operational costs.

It is contemplated that slugs of a gaseous oxidant or slugs of an aqueous solution of a water-soluble oxidant can be injected alternately with slugs of the leaching solution. Preferably, however, the leaching solution is injected in a continuous fashion throughout the solution mining operation and the slugs of oxidant are injected intermittently with the leaching solution, either by co-injection through the injection well or by dissolving the oxidant in a portion of the leaching solution.

In a preferred embodiment, the method of this invention involves the introduction of discrete slugs of (1) an oxidant-containing leaching solution and (2) an oxidant-free leaching solution into the formation wherein the mineral values to be recovered are solubilized in the injected fluid to form a pregnant liquor. The pregnant liquor is recovered for subsequent extraction of the mineral values. The slugs injected are displaced through the formation, preferably by a subsequently injected plurality of alternate slugs of oxidant-containing and oxidant-free solutions. Toward the end of the solution mining operation, the injected solutions can be displaced through the formation by additional oxidant-free leaching solution or by ground water which is drawn in from the surrounding formation by producing liquid from all the wells.

As used herein, the phrase "oxidant-free solution" means a solution which contains no more than a residual amount of oxidant. Generally, the oxidant-free leaching solution will contain a small amount of dissolved oxygen and/or other oxidant, such as less than about 5 ppm on a free oxygen basis. Preferably, the oxidant-free leaching solution employed is a portion of the barren liquor to which has been added carbon dioxide.

The quantity of leaching solution injected in each of the discrete slugs can vary widely and may require injection periods from a few hours to several months depending upon the size of the slug and the injection rate. Generally, each slug will be from about 0.1 to about 100 pore volumes of the formation to be leached, preferably from about 1 to about 50 pore volumes. Good results are obtained when each slug is between about 5 and about 20 pore volumes. The times required for injection will vary accordingly. For example, based on an injection rate of 1 pore volume per day, these described slug sizes require injection periods from about 0.1 to about 100 days, from about 1 to about 50 days and from about 5 to about 20 days.

The slugs of oxidant-containing and oxidant-free solutions can be the same size or different sizes. Preferably, the slugs of oxidant-containing solution are at least as large as the slugs of oxidant-free solution and good results are obtained when the slugs of oxidant-containing solution are at least twice as large as the slugs of oxidant-free solution.

The concentration of oxidant in the oxidant-containing leaching solution can vary widely. As a practical matter, the concentration of oxidant will be between about 50 ppm on a free oxygen basis and the concentration at which the leaching solution is saturated with oxidant at the downhole conditions in the injection well adjacent the formation to be leached. Preferably, the oxidant concentration is between about 100 and about 300 ppm on a free oxygen basis. Good results are obtained with an oxidant concentration of about 200 ppm on a free oxygen basis. Oxygen-bearing gases, particularly relatively pure oxygen, is preferred for use as the oxidant in this method, due to its relatively low cost and ease of handling.

In view of the pH of the leaching solution, there is a tendency for calcium salts, principally as carbonates, to be dissolved from the formation and to build up in the leaching solution. These dissolved salts can result in scaling and plugging problems when their concentration exceeds their solubility limits for the leaching solution. It is preferred that fresh makeup water be added to dilute the calcium and salt content of the leaching solution. This is accomplished by introducing additional formation water to the system, either by the highly preferred method of producing more liquid than is injected or alternatively by adding water to the barren solution, such as in the tank 28. In either case some of the barren liquor is bled out of the system and disposed of so that the total volume of leaching solution does not exceed the capacity of the system.

In spite of precautions taken to reduce scaling, certain individual injection wells can have a tendency to form deposits along the well bore thus reducing the injectivity of that well. The injectivity of such problem wells is improved by the addition of carbon dioxide, such as from pressurized container 68, directly into the well bore, such as through conduit 70. In this manner the carbonic acid content of the leaching solution in the problem well is increased in the well bore and the pH of the solution is lowered. In effect this provides an acid treatment for the well and dissolves some or all of the deposited scale and results in an improvement of the injectivity in that well.

The point in the system at which the carbonic acid is solubilized in the leaching solution is not critical and a source of carbonic acid can be provided at each of the individual injection wells so that the carbonic acid content of the leaching solution is formed and adjusted in each of the individual well bores. Normally, however, it is preferred to introduce the carbonic acid at a central point such as in mixing tank 36 as illustrated, except where an individual well requires additional carbonic acid to alleviate injectivity problems, as described above.

The invention is further described by the following examples which are illustrative of specific modes of practicing the invention and are not intended as limiting the scope of the invention defined by the appended claims.

EXAMPLE 1

This example illustrates the extraction by solution mining of uranium from a sedementary deposit of uranium bearing mineral in which the uranium is present in a mixture of various mineral forms including uraninite and coffinite. The uranium zone comprises a layer approximately 5 ft. to 200 ft. in thickness and is found below the surface a distance ranging from a few feet to 400 feet.

A pattern of wells is extended into the ore-bearing zone. The wells form a 5-spot pattern comprising 4 injection wells spaced evenly about a central production well, with the injection wells defining a square having 50 foot sides. The static water level is found to be 50 ft. from the surface.

Initially, water native to the formation is pumped into each of the injection wells at the rate of 6 gpm and it is found that the permeability of the formation would permit the injection of liquids at that rate. An aqueous ammonium bicarbonate solution (500 ppm) including hydrogen peroxide (50 ppm as free oxygen) is injected into each of the wells at the rate of 6 gpm. Within 24 hours from the initial injection, two of the injection wells are filled, indicating loss of injectivity, and it becomes necessary to increase the injection rate into the remaining two wells to about 10 gpm to maintain the desired total volume of injection. By the end of the second week of injections, injectivity of all four wells has fallen to the point where operations must be discontinued. During this period the uranium concentration in the produced fluids from the production well reaches a high of about 13 ppm.

The wells are pumped out drawing formation water in from the perimeter of the 5-spot pattern. After seven days of this treatment the injectivities are found to be restored and injection rates of 6 to 12 gpm are again possible.

An aqueous solution of hydrogen peroxide (50 ppm as free oxygen) is injected at the rate of 6 gpm into the four injection wells. Carbon dioxide gas is introduced at about 2 pounds per hour into the injection well which exhibited the poorest injectivity restoration, while maintaining the introduction of the aqueous hydrogen peroxide solution. Shortly after carbon dioxide is introduced into this well, a further improvement in injectivity of that well is noted. The carbon dioxide is then introduced into the formation water at the mixing tank along with a 50 weight percent hydrogen peroxide solution and the aqueous leaching solution thus formed is then distributed to all four of the injection wells. The carbon dioxide is added at the rate of about 9 pounds per hour and the pH of the leaching solution introduced into the injection wells is between about 6.6 and 6.7. The pH of the pregnant liquor pumped from the production well is between about 6.7 and 6.8. The bicarbonate concentration in the pregnant liquor is permitted to build up to a level of between about 610 ppm and 690 ppm and the uranium concentration in the pregnant liquor thus produced is nominally 30 ppm. Acceptable well injectivities are maintained for the remainder of the test, a period of more than one year.

The pregnant liquor extracted from the production well is treated as shown in the drawing by filtration followed by contact with the strong base anion exchange resin to strip the uranium values from the solution. The barren liquor is then circulated through a mixing tank where hydrogen peroxide, in the form of a 50 weight percent solution, and carbon dioxide gas are added to form fresh leaching solution.

This example demonstrates the superior injectivity and permeability maintenance achieved using a dilute carbonic acid leaching solution as compared to an alkaline ammonium bicarbonate leaching solution.

EXAMPLE 2

In accordance with the method of this invention, uranium is extracted from the subterranean formation described in Example 1 by solution mining using intermittent oxidant injection.

During a first preselected period of about 6 months, a dilute carbonic acid solution containing hydrogen peroxide is introduced into the formation. This oxidant-containing solution contains nominally 700 ppm of bicarbonate anion and nominally 200 ppm of hydrogen peroxide on a free oxygen basis.

Then, during a second preselected period of about 33 days, a dilute carbonic acid solution to which no oxidant is added is introduced into the formation. This oxidant-free solution contains nominally 700 ppm of bicarbonate anion and less than about 5 ppm of oxidant. (The residual oxidant is due to the absorption of oxygen from the atmosphere.) Subsequently, the introduction of the oxidant-containing solution is reinstituted.

During the test, pregnant liquor is continuously recovered from the production well and treated to extract the uranium values as described in Example 1. The nominal concentration of uranium in the pregnant liquor during the first time period and about 11 days into the second time period is about 20 ppm, at which time the uranium concentration slowly declines to a steady nominal value of about 10 ppm prior to reintroduction of the oxidant-containing solution. This rate of uranium production decline is far less than would be expected if the oxidant injected in the first preselected period of time had, in fact, been consumed.

This example shows that the oxidant apparently consumed from the oxidant-containing leaching solution is later desorbed into the oxidant-free leaching solution with a resulting more efficient use of the oxidant. Within 25 days of the reintroduction of oxidant, the uranium concentration in the pregnant liquor is observed to return to the 20 ppm nominal range.

EXAMPLE 3

The effectiveness of the process of the carbonic acid leaching solution in the extraction of uranium values from ore deposits is demonstrated by the following laboratory tests. The ore samples utilized in the tests are obtained from the deposit of Example 1.

Samples of the ore are placed in containers along with a volume of leaching solution equivalent to two pore volumes of the ore sample. The oxidizing agent in all but one test is provided by bubbling oxygen through the leaching solution-ore mixture during the testing period. In one test, hydrogen peroxide is introduced with the leaching solution as the oxidizing agent. Contact between the ore and the leaching solution is maintained for 25 hours accompanied by stirring. Samples of the leaching solution are extracted every 5 hours and tested for their uranium content.

The leaching solutions being tested include an aqueous ammonium bicarbonate solution (1000 ppm) and a dilute carbonic acid solution prepared by bubbling carbon dioxide gas through ordinary tap water at room temperature and atmospheric pressure. The tests and results are summarized in Table A.

TABLE A

| Run No. | Ore Sample Weight (gms.) | Pore Volume (ml) | Leaching Agent | Leaching Solution Volume (ml.) | pH | Oxidant | Uranium in Solution (ppm) 5 Hr. | 10 Hr. | 15 Hr. | 20 Hr. | 25 Hr. |
|---|---|---|---|---|---|---|---|---|---|---|---|
| 1 | 357 | 105 | NH$_4$HCO$_3$ (1000 ppm) | 210 | 7.5 | O$_2$ | 155 | 170 | 190 | 205 | 210 |
| 2 | 360 | 100 | CO$_2$ in Water | 200 | 6.5 | O$_2$ | 350 | 460 | 545 | 620 | 715 |
| 3 | 360 | 100 | CO$_2$ in Water | 200 | 6.0 | H$_2$O$_2$ (100 ppm free oxygen basis) | 270 | 385 | 460 | 545 | 600 |

From the foregoing it will be seen that in employing the process of the present invention, plugging problems and loss of injectivity normally associated with sodium and ammonium bicarbonate leaching solutions are reduced and the productivity of the solution mining process is maintained with intermittent oxidant injection. In addition, it has been shown that the leaching solution employed in the present process is highly effective in solubilizing uranium values from ore deposits.

While particular embodiments of the invention have been described, it will be understood, of course, that the invention is not limited thereto since many obvious modifications can be made, and it is intended to include within this invention any such modifications as will fall within the scope of the appended claims.

Having now described the invention, I claim:

1. In a method for the solution mining of a substance which in an oxidized state is soluble in an aqueous leaching solution, said method comprising the steps of (1) introducing an oxidant and an aqueous leaching solution into a subterranean formation containing said substance, thereby to solubilize said substance in situ to form a pregnant liquor, (2) recovering said pregnant liquor from said formation, and (3) separating said substance from said pregnant liquor, the improvement comprising:

utilizing as said aqueous leaching solution a solution comprising a dilute aqueous carbonic acid solution; and intermittently introducing said oxidant into said formation.

2. The method defined in claim 1 wherein said leaching solution has a bicarbonate ion concentration between about 380 ppm and about 1000 ppm and a pH less than about 7.

3. The method defined in claim 1 wherein said leaching solution has a bicarbonate ion concentration between about 460 ppm and about 700 ppm and a pH between about 6 and about 7.

4. The method defined in claim 1 wherein said oxidant is selected from the group consisting of potassium permanganate, hydrogen peroxide, potassium ferricyanide, sodium hypochlorite, potassium peroxydisulfate, oxygen and oxygen-containing gases.

5. The method defined in claim 1 wherein said oxidant is dissolved in a portion of said leaching solution to form an oxidant-containing solution, and wherein at least one slug of said leaching solution which is relatively oxidant-free is injected into said formation between slugs of said oxidant-containing solution.

6. The method defined in claim 5 wherein the concentration of said oxidant in said oxidant-containing solution is between about 50 ppm on a free oxygen basis and the concentration at which said oxidant-containing solution is saturated with said oxidant upon introduction into said formation.

7. The method defined in claim 5 wherein the concentration of said oxidant in said oxidant-containing solution is between about 100 ppm and about 300 ppm on a free oxygen basis.

8. The method of claim 1 wherein said substance is selected from the group consisting of uranium, thorium, vanadium, copper, nickel, molybdenum, rhenium and selenium.

9. A method for the solution mining of metal values selected from the group consisting of uranium, thorium, vanadium, copper, nickel, molybdenum, rhenium and selenium, from a subterranean formation containing said metal values, comprising the steps of:

(a) penetrating said formation with at least one injection well and at least one production well in spaced relation with said injection well;

(b) introducing into said formation through said injection well discrete slugs of (1) an oxidant-containing leaching solution comprised of a dilute aqueous carbonic acid solution containing an oxidant selected from the group consisting of hydrogen peroxide, oxygen and oxygen-containing gases, and (2) an oxidant-free leaching solution comprised of a dilute aqueous carbonic acid solution to leach in situ said metal values from said formation thereby forming a pregnant liquor, each of said oxidant-containing and oxidant-free solutions having a pH less than about 7 and a bicarbonate ion concentration between about 380 ppm and about 1000 ppm, and the concentration of said oxidant in said oxidant-containing solution being between about 100 ppm and about 300 ppm on a free oxygen basis;

(c) recovering said pregnant liquor at said production well;

(d) forming a barren liquor by separating said metal values from said pregnant liquor;

(e) introducing gaseous carbon dioxide into at least a portion of said barren liquor thereby to form a dilute carbonic acid solution; and (f) recycling at least a portion of the solution formed in step (e) for reintroduction into said formation to displace said slugs of said oxidant-containing and oxidant-free solutions through said formation.

10. The method defined in claim 9 wherein step (b) further comprises alternately introducing a plurality of discrete slugs of said oxidant-containing solution and said oxidant-free solution into said formation.

11. The method defined in claim 10 wherein the slugs of said oxidant-containing and oxidant-free solutions are between about 1 and about 100 pore volumes in size.

12. The method defined in claim 10 wherein the slugs of said oxidant-containing solution are at least as large as the slugs of said oxidant-free solution.

13. The method defined in claim 9 wherein said oxidant-free solution contains less than about 5 ppm of oxidant on an free oxygen basis.

14. The method defined in claim 9 wherein said metal values are uranium values.

15. The method defined in claim 9 wherein each of said oxidant-containing and oxidant-free solutions have a pH between about 6 and about 7 and have a bicarbonate ion concentration between about 460 ppm and about 700 ppm.

16. The method defined in claim 1 wherein said aqueous leaching solution is introduced into said formation in a substantially continuous manner and wherein slugs of said oxidant are injected intermittently with said aqueous leaching solution.

17. The method defined in claim 1 wherein slugs of said oxidant are introduced into said formation alternately with slugs of said aqueous leaching solution.

* * * * *